Nov. 10, 1953
S. H. ENOCHIAN
2,658,223
WIPER BLADE FOR CURVED WINDSHIELDS
Filed March 28, 1951
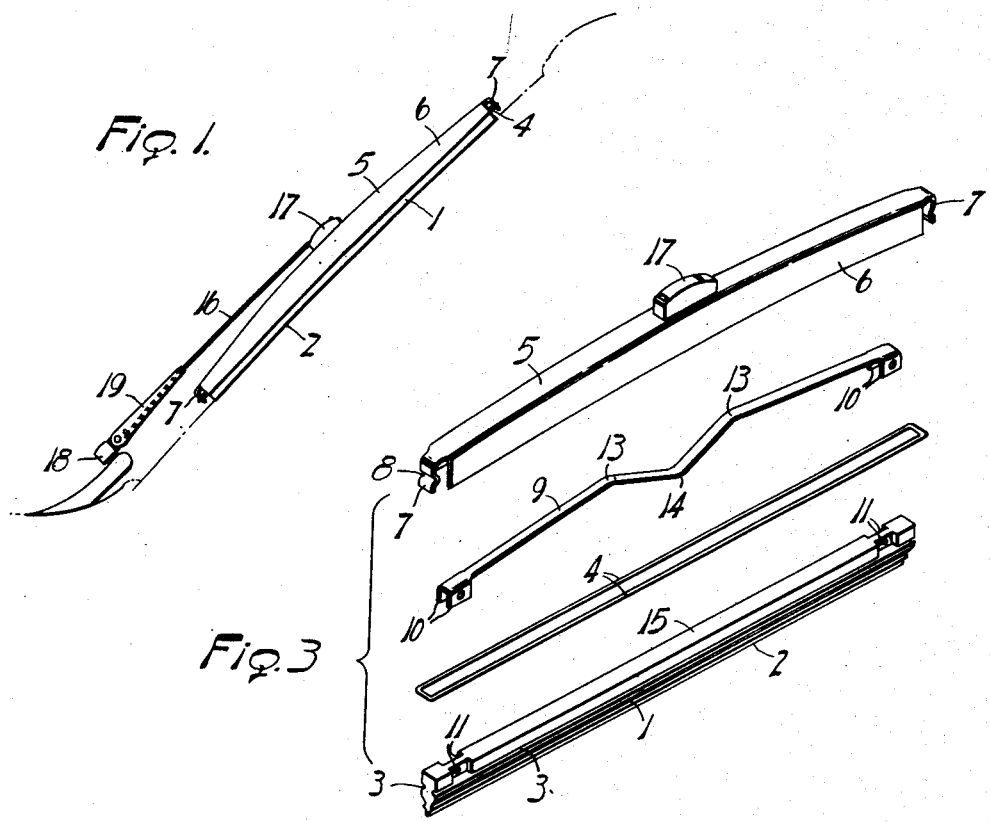
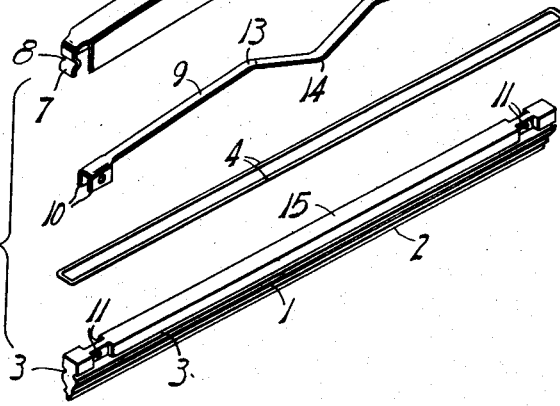
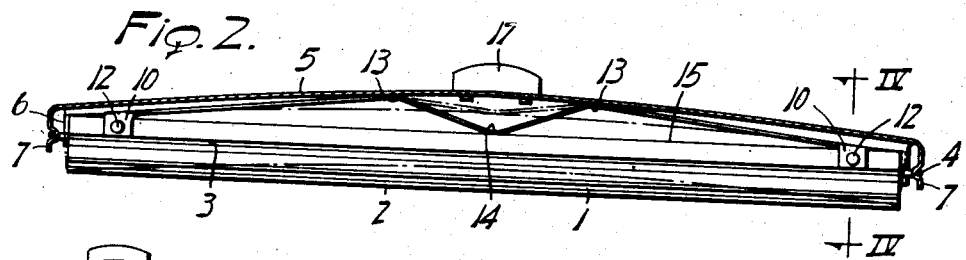
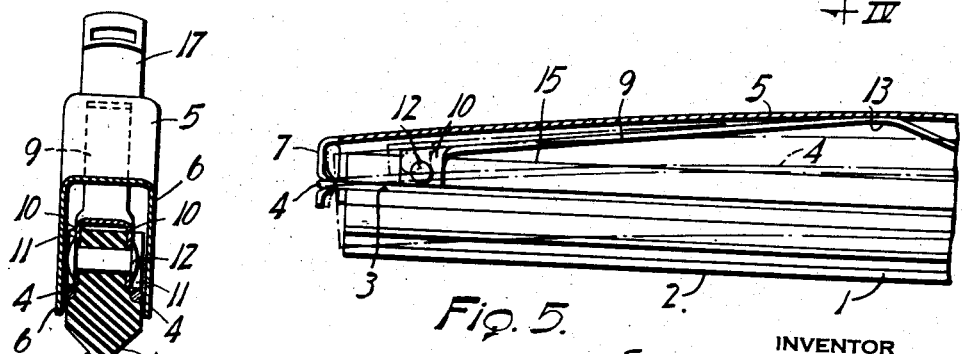
INVENTOR
Samuel H. Enochian
BY
Bean, Brooks, Buckley & Bean.
ATTORNEYS Patented Nov. 10, 1953

2,658,223

UNITED STATES PATENT OFFICE 2,658,223

WIPER BLADE FOR CURVED WINDSHIELDS

Samuel H. Enochian, Kenmore, N. Y., assignor to Trico Products Corporation, Buffalo, N. Y.

Application March 28, 1951, Serial No. 218,048

11 Claims. (Cl. 15—245)

This invention relates to the windshield cleaning art and more particularly to a wiping blade which is suitable for both flat and curved surfaces, the primary object being to provide an improved wiper in which the wiping contact is maintained uniformly throughout the length of the wiping edge.

Ordinarily the wiping edge is designed for surface conformance and with this thought in mind the attention has been centered upon the flexibility of the support with regard to the uniform firmness of contact throughout the length of the wiping edge.

The present invention has for a further object to provide a blade in which the wiping edge is supported in a manner to enable a firm wiping contact without the tendency to wrinkle when passing over highly curved areas for greater wiping efficiency. Again, the invention has for its object to provide a wiping body in which the wiping edge is given resilient support at its central portion as well as toward the ends thereof.

The foregoing and other objects will manifest themselves as the following description progresses, reference being had to the accompanying drawing, wherein Fig. 1 is a side elevation showing a practical application of the present invention;

Fig. 2 is a longitudinal section through the channeled holder of the blade to show the relation of the squeegee body and the associated parts;

Fig. 3 is an exploded view of the blade components;

Fig. 4 is a transverse sectional view taken about on line 4—4 of Fig. 2; and

Fig. 5 is an enlarged fragmentary view similar to Fig. 2 but depicting more clearly the yielding action of the squeegee body within the channeled holder.

Referring more particularly to the drawings, the numeral 1 designates the squeegee body which is formed of rubber or other elastic material and has a wiping edge 2 and oppositely facing lateral grooves or seats 3 for receiving a pair of parallel suspending members 4. The squeegee body is mounted for receding and distending movement within the channel of a holder 5 having guiding side walls 6. For mounting the suspending members 4 within the holder, the latter is provided with resilient end fingers 7, and to facilitate the attachment of the members 4 thereto, said members being formed as parts of an endless band designed to engage in seats 8 in the fingers. The fingers 7 afford a resilient support for the strands or members 4 so that the intermediate portions of the latter may flex as the wiping edge follows the curvature of the surface being wiped.

In order to maintain firmness of contact throughout the length of the wiping edge, the squeegee body is provided with a tensioning frame 9 in the form of a bowed flat spring having terminal ears 10 straddling the squeegee body and engaging in lateral seats 11 therein where the ears are attached by means of a fastener 12. The intermediate portion of the tensioning frame 9 is shaped to provide spaced points of fulcrum 13, designed to engage and bear upon the top wall of the holder channel, and an intermediate point of support 14 bearing upon the intermediate back portion of the back face 15 of the squeegee body. This arrangement not only provides a resilient support for the intermediate portion of the squeegee body, but primarily functions to extend the resilient frame as the squeegee body recedes into the channel by reason of the surface curvature. Such frame extension serves to subject the squeegee body to a tensioning action, mainly above its neutral axis distending the elastic body somewhat as indicated by the broken lines in Figs. 2 and 5, and thereby more firmly causes the wiping edge to maintain its contact with the surface curvature. Because of the wiping edge being partially under tension, its tendency to wrinkle or buckle is minimized thereby giving the wiping edge solid and firm engagement with the surface to remove all excess moisture therefrom. The greater the receding action of the squeegee body within the channeled holder, the greater will be the firmness of wiping contact by reason of the increased extension of the spring frame 9. During such body distension portions of the body may slide along the suspension members 4.

For attaching the blade to its actuating arm 16, the holder is formed with a clip 17 intermediate its length so that when the wiper is oscillated by the usual oscillating shaft 18, the squeegee body is free to rock about its wiping edge at the beginning of each stroke, during which action one or the other of the suspension members 4 will yield against the tension of the fingers 7, sufficient clearance being provided between the squeegee body and the side walls 6 of the holder to permit such rocking action.

The blade is practical in that it will provide a firm wiping contact on a curved surface and will properly distribute the pressure of the arm spring throughout the length of the wiping edge regardless of whether the surface is flat or curved. The parts are readily assembled for the sake of economy, and while the foregoing description has been given in detail, it is intended that the inventive principles involved are capable of assuming other physical embodiments without departing from the spirit of the invention and the scope of the appended claims.

What is claimed is:

1. A windshield wiping blade comprising an elastic squeegee body having a wiping edge, a channeled holder receiving the squeegee body for receding motion, and body distending means arranged within the holder channel and having terminal parts connected to the opposite ends of the body and a medial portion providing resilient support for the intermediate portion of the body and acting in response to a receding movement of such intermediate portion into the holder to move the terminal parts further apart to increase the tension on the body lengthwise for accordingly increasing the firmness of contact of the wiping edge with the surface being wiped.

2. A windshield wiping blade comprising an elastic squeegee body having a wiping edge and oppositely facing lateral seats, a holder having a channel slidably receiving the squeegee body and resilient supports beyond the opposite ends of the latter, and a flexible non-extensible suspension member carried by the resilient supports and engaging in the lateral seats to support the body for receding movement.

3. A windshield wiping blade comprising an elastic squeegee body having a wiping edge and oppositely facing lateral seats, a holder having a channel receiving the squeegee body, flexible suspension members carried by the holder within the channel and engaging in the lateral seats to support the body for receding movement, and an arched spring within the channel giving support to the intermediate portion of the squeegee body and having terminal parts connected to the ends of the latter to distend the same when the arched formation is flattened by the receding movement.

4. A windshield wiping blade comprising an elastic squeegee body having a wiping edge and oppositely facing lateral seats, a holder having a channel receiving the squeegee body, flexible suspension members carried by the holder within the channel and engaging in the lateral seats to support the body for receding movement into the channel, and a bowed spring within the channel giving support to the intermediate portion of the squeegee body, said bowed spring seating against the upper wall of said holder and having its ends connected to the ends of said body for distending the latter during the receding movement of the squeegee within said channel.

5. A windshield wiping blade comprising an elastic squeegee body having a wiping edge and oppositely facing lateral seats, a holder for said blade having a channel receiving the squeegee body, said holder having terminal resilient fingers overhanging the opposite ends of the squeegee body, and a flexible non-extensible member suspended from said fingers and engaging in the lateral seats to support the body for receding movement with the channel.

6. A windshield wiping blade comprising an elastic squeegee body having a wiping edge, a channeled holder receiving and supporting the squeegee body at its end with its intermediate portion suspended for receding motion, and body distending means having longitudinally separable terminal parts engaging the opposite end portions of the body and a medial part operable by the intermediate portion of the body during its recession to distend the body.

7. A windshield wiping blade comprising an elastic squeegee body having a wiping edge, a channeled holder receiving the squeegee body for receding motion, and body distending means acting to increase the longitudinal tension upon the body as the body recedes when the surface curvature increases for accordingly increasing the firmness of contact of the wiping edge with such surface, said means being in the form of a flat spring contained within the holder and having terminal parts attached to the ends of said body for imparting longitudinal forces to distend the body and also having an intermediate arched part adapted to be flattened somewhat by the receding body to impart such forces to the body.

8. A windshield wiping blade comprising an elastic squeegee body having a wiping edge and oppositely facing lateral seats, a holder having a channel receiving the squeegee body for receding therein and resilient supports beyond the body ends and a flexible suspension member in the form of an endless wire loop passed about the resilient supports and engaging in the lateral seats, said body being slidably supported on the suspension member.

9. A windshield wiping blade comprising an elastic squeegee body having a wiping edge and oppositely facing lateral seats, a holder having a channel receiving the squeegee body for receding therein, a flexible non-extensible suspension member resiliently carried by the holder within the channel and slidably engaging in the lateral seats, and a distending means acting to distend the body lengthwise along the suspension member as the body recedes within the channel.

10. A windshield wiping blade comprising an elastic squeegee body having a wiping edge and lateral seats extending lengthwise thereof, a holder having a channel receiving the squeegee body and terminal supports beyond the latter, and a flexible non-extensible suspension member in the form of an endless loop passed about the terminal supports and slidably engaging the lateral seats to support the body for receding and lateral rocking movement.

11. A windshield wiping unit comprising an elastic squeegee body having a wiping edge portion and oppositely spaced lateral seats, a channeled holder receiving the squeegee body for receding movement, a flexible supporting member resiliently carried by said holder and engaging said seats to flexibly support the squeegee body, a flat spring disposed within the channel and having spaced terminal parts connected to the opposite ends of the body, said spring comprising spaced apexes formed substantially along its central portion for being more or less flattened against the top wall of said holder by the receding action of the squeegee body during operation of said wiping unit.

SAMUEL H. ENOCHIAN.

References Cited in the file of this patent

UNITED STATES PATENTS

| Number | Name | Date |
|---|---|---|
| 2,303,694 | Horton | Dec. 1, 1942 |
| 2,537,411 | Klingler | Jan. 9, 1951 |

FOREIGN PATENTS

| Number | Country | Date |
|---|---|---|
| 433,467 | Great Britain | of 1935 |
| 820,156 | France | of 1937 |

OTHER REFERENCES

Anderson Co. Publication, Gary, Ind., effective Nov. 1, 1946, pages 2 and 3. (A copy in Div. 27.)